US007245678B2

(12) United States Patent
Tanaka

(10) Patent No.: US 7,245,678 B2
(45) Date of Patent: Jul. 17, 2007

(54) DIGITAL WIRELESS RECEIVER USING ANTENNA DIVERSITY METHOD

(75) Inventor: Tomohisa Tanaka, Kobe (JP)

(73) Assignee: TOA Corporation, Kobe-shi, Hyogo-ken (JP)

( * ) Notice: Subject to any disclaimer, the term of this patent is extended or adjusted under 35 U.S.C. 154(b) by 333 days.

(21) Appl. No.: 10/514,986

(22) PCT Filed: May 30, 2003

(86) PCT No.: PCT/JP03/06808

§ 371 (c)(1),
(2), (4) Date: Nov. 18, 2004

(87) PCT Pub. No.: WO03/103186

PCT Pub. Date: Dec. 11, 2003

(65) Prior Publication Data

US 2006/0067442 A1    Mar. 30, 2006

(30) Foreign Application Priority Data

Jun. 3, 2002    (JP) .............................. 2002-161474

(51) Int. Cl.
*H04B 7/10* (2006.01)
(52) U.S. Cl. .................................................. 375/347
(58) Field of Classification Search ................. 375/347
See application file for complete search history.

(56) References Cited

U.S. PATENT DOCUMENTS

| | | | |
|---|---|---|---|
| 5,291,519 A | | 3/1994 | Tsurumaru |
| 5,557,603 A | * | 9/1996 | Barlett et al. ................ 370/228 |
| 5,781,592 A | | 7/1998 | Masuda |
| 5,930,248 A | * | 7/1999 | Langlet et al. ............... 370/347 |
| 6,023,615 A | * | 2/2000 | Bruckert et al. ......... 348/14.08 |
| 6,118,773 A | * | 9/2000 | Todd .......................... 370/334 |
| 6,862,275 B1 | * | 3/2005 | Dabak ........................ 370/342 |

FOREIGN PATENT DOCUMENTS

| | | |
|---|---|---|
| JP | 04-010817 | 1/1992 |
| JP | 2000-188566 | 7/2000 |
| JP | 2001-024575 | 1/2001 |

(Continued)

*Primary Examiner*—David C. Payne
*Assistant Examiner*—Rahel Guarino
(74) *Attorney, Agent, or Firm*—Duane Morris LLP

(57) ABSTRACT

Receiving antennas 2a, 2b receive a digital modulated signal from a digital wireless microphone. The digital modulated signal comprises a carrier signal modulated with successively generated digital signal trains. A changeover switch 4 selects one of the antennas 2a, 2b in response to a selection signal. A high-frequency unit 8, a demodulating unit 10 and a decoding unit 12 receive and demodulate the digital modulated signal received by the selected antenna. Analog comparators 24a, 24b compare a reception level indicative signal from the high-frequency unit 8 with threshold values, and a diversity judging unit 28 changes the selection signal in accordance with the comparison result. The digital signal trains comprise a plurality of successive frames, and each frame includes an information data section, a preamble section preceding the information data section for establishing synchronization of the information data section, and a guard bit section succeeding the information data section. Each time the guard bit section is received, the selection signal is changed and the antenna selection is performed.

5 Claims, 4 Drawing Sheets

FOREIGN PATENT DOCUMENTS

| | | |
|---|---|---|
| JP | 2001-244861 | 9/2001 |
| JP | 2001-298401 | 10/2001 |
| JP | 2002026784 | 1/2002 |
| JP | 2002-101028 | 4/2002 |
| JP | 2002-135156 | 5/2002 |

* cited by examiner

DIGITAL WIRELESS RECEIVER USING ANTENNA DIVERSITY METHOD

TECHNICAL FIELD

This invention relates to a digital wireless receiver, and, more particularly, to an antenna diversity digital wireless receiver.

BACKGROUND OF THE INVENTION

A diversity receiver is adapted to receive an electromagnetic wave in a good condition transmitted from a signal source which transmits the wave while moving, by reducing effects of dead points. An example of such signal source is a wireless microphone. There are various types of diversity system. An antenna diversity system is expected to be the most cost effective system. This system employs a plurality of receiving antennas and a single receiving unit. The receiving antennas are disposed at different locations in a communication area. One of signals received at the antennas is coupled to the receiving unit through an antenna switching unit. The antenna switching unit is operated in such a manner that the receiving level at the receiving unit can be larger.

If the signal source transmits an analog signal, an instantaneous value detected at an analog receiver receiving such analog signal constitutes part of the demodulation output. However, if the signal source is digitally transmitting, an instantaneous value received by a digital receiver receiving such a digital signal can form only part of digital data forming a digital data train. A digital data train includes plural pieces of digital data, and each digital data piece is a quantized version of each sampling value produced by sampling an audio or video signal at a predetermined sampling frequency. In order to produce a sound or a picture ultimately in a digital receiver, part of digital data detected from time to time must be collected for each sample in an appropriate arrangement. Therefore, it is necessary to synchronize data pieces for respective samples. If synchronization is not established, the demodulated audio output or video output cannot be assured to correspond to the digital data train, but queer sound would appear in the reproduced sound output, or a picture different from the original one would be reproduced.

In a digital wireless receiver employing an antenna diversity system as described above, each time the antenna is switched, it is necessary to establish synchronization for respective samples on the basis of a signal received at a new antenna selected by the switching. In a cellular phone and digital cordless phone, which are digital wireless systems, but employ time-division multiplexing system, the digital wireless receiver needs to synchronize only when it is receiving a receiver channel assigned to it. (According to the time-division multiplexing, a single high-frequency channel is temporally divided, and channels are assigned to various receivers.) Accordingly, the antenna switching can be done when channels for other receivers are being received.

On the other hand, in a unidirectional communication system, which is not a time-division multiplexing system, and in which a set of transmitter and receiver exclusively uses one high-frequency channel, e.g. a system including a wireless microphone and a dedicated receiver therefor, the dedicated receiver receives the one high-frequency channel all the time, and, therefore, each time a different antenna is selected, it must be re-synchronized.

An object of the present invention is to make it possible to smoothly re-synchronize an antenna diversity receiver for use in a unidirectional digital communication.

DESCRIPTION OF THE INVENTION

An antenna diversity digital wireless receiver according to the present invention is provided with a plurality of antennas. Preferably, the antennas are disposed at different locations in a communication area. The receiving antennas are adapted to receive a digital modulated signal sent from the same source, e.g. a wireless microphone. The digital modulated signal is a carrier signal modulated with successively generated digital signal trains. In response to a selection signal, antenna selecting means selects one of the antennas. Receiving and demodulating means receives and demodulates the digital modulated signal as received by the antenna selected by the antenna selecting means. Level detecting means provides a reception level indicative signal indicative of the reception level of the digital modulated signal. Preferably, the level detecting means is provided in the receiving and demodulating means. Control means compares the reception level indicative signal with at least one threshold value and changes the selection signal in accordance with the result of the comparison. The digital signal train comprises a plurality of successive frames. Each frame comprises an information data section, a preamble section preceding the information data section for establishing synchronization of the information data section, and a guard bit section succeeding the information data section. The information data section includes at least one quantized sampling value. The preamble section is information relating to the arrangement of bits forming the sampling value. The guard bit section comprises an appropriate number of bits. Each time the guard bit section is received, the changing of the selection signal by the control means and the selection of antennas by the antenna selecting means are performed.

The antenna diversity digital wireless receiver according to the present invention performs antenna switching when it receives the guard bit section in each frame, and the guard bit section is used exclusively for the antenna switching. Accordingly, the antenna switching upon receipt of the guard bit section does not interfere with information data synchronization in each frame. In addition, immediately after the antenna switching based on the guard bit section is done, the preamble section and information data section of the next frame are received, and synchronization is attained in the next frame. Accordingly, receiving and demodulation can be continuously done without any trouble.

The threshold value may be set at a reception level corresponding to a predetermined bit error rate, and muting means is used, which operates when the reception level is below such threshold value.

With this arrangement, the antenna switching is done each time the guard bit section in each frame is received. In this case, if the reception level is smaller than the reception level corresponding to the predetermined bit error rate, the number of bit errors is judged to be large, in which case a recovered sound may highly possibly contain abnormal sound if the data information has been prepared from a digital audio signal. Then, the muting means is activated to prevent undesirable output such as abnormal sound from being sent out. Since the antenna switching is performed each time the guard bit section of each frame appears, the muting is automatically interrupted when the antenna providing a reception level with a small bit error rate is selected.

First and second threshold values may be employed for the said threshold value. The first threshold value is set at a reception level corresponding to a predetermined bit error rate, while the second threshold value is set at a value larger than the first threshold value, for example, at a reception level at which a bit error rate is considered to be smaller than the said predetermined bit error rate. The control means causes the muting means to operate when the reception level indicative signal is smaller than the first threshold value, and, when the reception level indicative signal is larger than the second threshold value, fixes the selection signal at the then value.

With this arrangement, the first and second threshold values define, for the reception level, a first region below the first threshold value, a second region between the first and second threshold values, and a third region above the second threshold value. When the reception level indicative signal is in the first and second regions, the control means performs judgment and antenna switching each time the guard bit section in each frame is received. Further, when the reception level indicative signal is in the first region, the muting means is operative. The reception level indicative signal in the third region may indicate that the reception level is such that there are few bit errors, so that the antenna switching is not done, whereas the judgment is made in the control means each time the guard bit section is received.

The reception level indicative signal and the threshold value may be in the form of analog signals. Then, the control means is provided with analog comparing means for comparing the reception level indicative signal with the threshold value. The threshold value may be variable. The analog comparing means may have hysteresis.

With this arrangement, by virtue of the analog signal comparison, a time for digital conversion and a processing time for digital value comparison are not required, which provides high-speed processing, and, which can reduce the cost.

The information data may be error-correction coded data. In such arrangement, the receiving and demodulating means performs error correction and also computes the bit error rate. The control means causes the muting means to operate when the computed bit error rate is larger than a predetermined bit error rate threshold value. At the same time, the selection signal is changed by the control means and the antenna selecting means selects an antenna each time the guard bit section is received.

With this arrangement, not only when the reception level becomes low, but also when the actual bit error rate is larger than the predetermined value, the reception level is judged improper. This causes the antenna switching to be done and also causes the muting means to operate in order to prevent improper output from being provided.

BEST MODE FOR EMBODYING THE INVENTION

Figure 1:
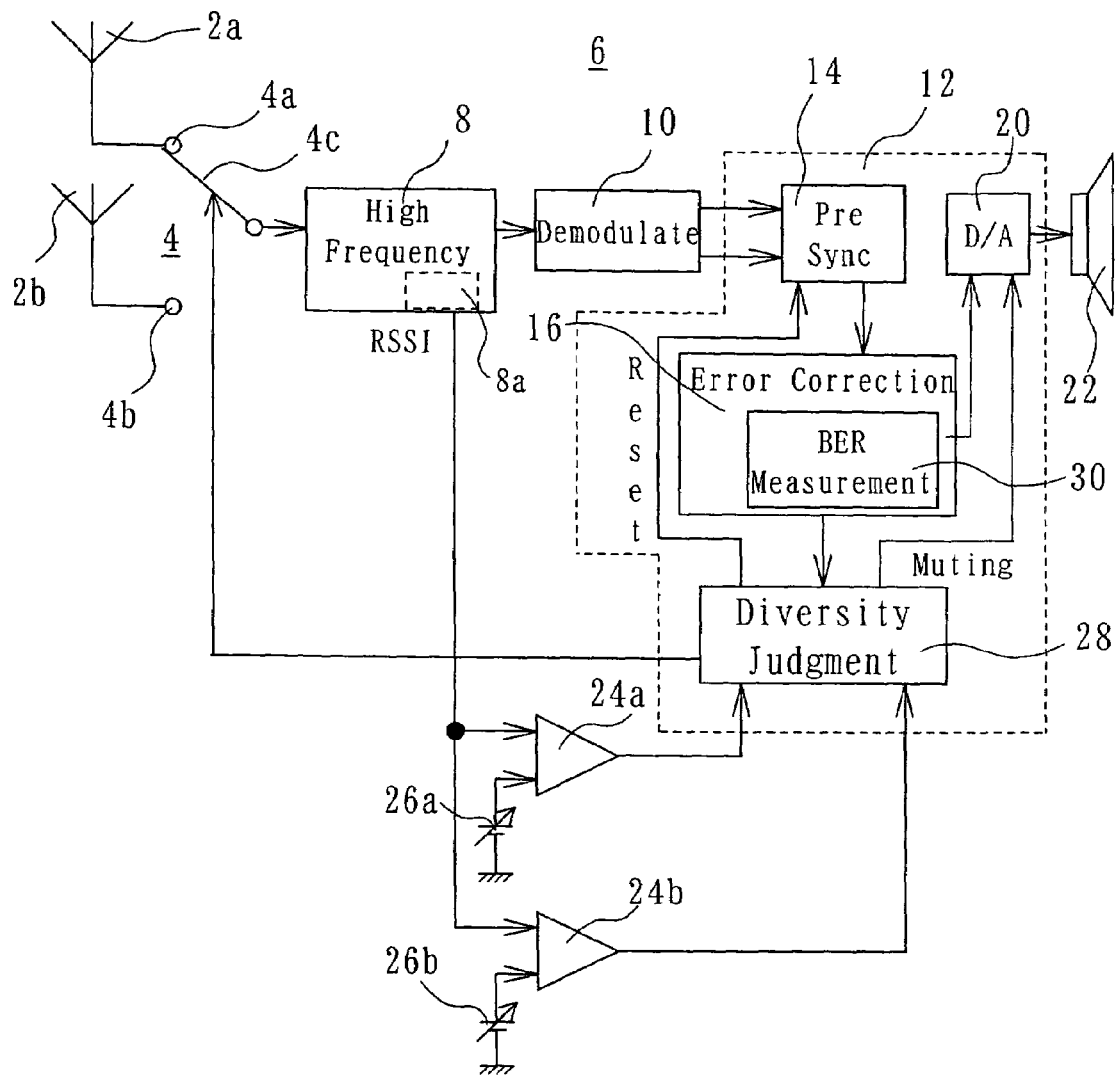
FIG. 1 is a block circuit diagram of a digital wireless receiver according to one embodiment of the present invention.

An antenna diversity digital wireless receiver according to an embodiment of the present invention is, for example, a receiver for use with a digital wireless microphone. As shown in FIG. 1, such digital wireless receiver includes a plurality of receiving antennas, for example, two receiving antennas 2a and 2b, which are disposed at different locations in a communication area in which the digital wireless microphone is being used.

The receiving antennas 2a and 2b are connected to contacts 4a and 4b, respectively, of antenna selecting means, e.g. an antenna changeover switch, 4. The changeover switch 4 has a contact arm 4c in addition to the contacts 4a and 4b. The contact arm 4c is connected to either the contact 4a or the contact 4b designated by a selection signal, e.g. a switching signal, applied to it from a diversity judging unit described in detail later. In this way, a received signal (a digital modulated signal transmitted from the digital wireless microphone) received at either the antenna 2a or the antenna 2b is coupled to the contact arm 4c.

The contact arm 4c is connected to receiving and demodulating means, e.g. a high-frequency unit 8 of a receiving unit 6. The high-frequency unit 8 is of a superheterodyne type, which includes a high-frequency amplifier, a frequency converter, an intermediate frequency amplifier, and other components, and operates to frequency translate the received signal inputted to the high-frequency amplifier 8 to an intermediate frequency signal at a desired frequency.

The resulting intermediate frequency signal is applied to a demodulating unit 10, which demodulates the received intermediate frequency signal.

Figure 2:
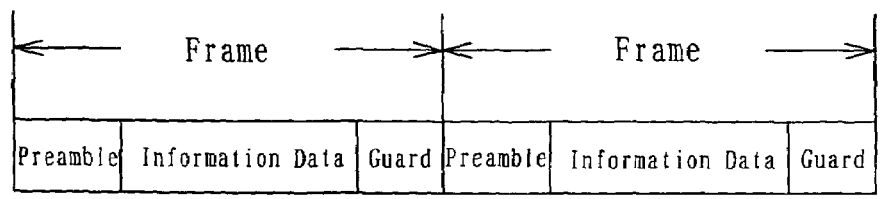
FIG. 2 shows a configuration of a digital signal to be received by the digital wireless receiver shown in FIG. 1.

A digital wireless microphone collects an analog audio signal, samples the collected analog audio signal at a predetermined sampling frequency, quantizes the resultant sample values, and produces the quantized digital audio signals successively. In order to serially transmit the digital audio signals, frames are formed. As shown, for example, in FIG. 2, each frame includes an information data section including a serial arrangement of at least one digital audio signal, and a preamble section preceding the information data section. The preamble is information to be used to process the information data to reconstruct the digital audio signal. In other words, the preamble is information for use in synchronization. The frame of the embodiment being described further includes a guard bit section including plural bits succeeding the information data section. Although not shown, the information data section of each frame is provided with data for error correction coding. In this manner, a digital signal train is formed for each frame. A carrier signal at a predetermined frequency is modulated with the digital signal trains, which results in a digital modulated signal.

By demodulating, in the demodulating unit 10, the intermediate frequency signal produced from the digital modulated signal as received at the receiving unit 6, the digital signal trains are demodulated. At the same time, clocks synchronized with respective ones of the frames are recovered from the digital signal trains in the demodulating unit 10.

The digital signal trains and the recovered clocks are applied to a preamble section synchronizing circuit (Pre Sync) 14 of decoding means, e.g. a decoding unit 12. The preamble section synchronizing circuit 14 synchronizes the digital signal trains with the recovered clocks, detects the preamble section of the frames, and detects the information data and the guard bits based on the detected preamble sections. The detected information data is coupled to an error correcting unit 16, where the error correction code contained in the information data is used for error correction, and the digital audio signal is decoded. The decoded digital audio signal is applied to a digital-to-analog converting unit 20, where it is converted to an analog audio signal, and a sound is emitted from a loudspeaker 22. The digital-to-analog converting unit 20 is provided with a muting circuit (not shown), which operates to inhibit outputting of the analog audio signal when a muting signal from a diversity judging unit 28 described later, is applied to it.

The high-frequency unit 8 is provided with reception level detecting means, e.g. a received signal strength indicative signal generator 8a. A received signal strength indicative (RSSI) signal the received signal strength indicative signal generator generates is an analog signal, e.g. in the form of a DC voltage, which, for example, as shown in FIG. 3, increases in proportion to the reception level within a range between a first reception level, e.g. about 10 dB µV, and a second reception level, e.g. about 70 dB µV, and is saturated when the reception level exceeds the second reception level.

The RSSI signal is applied to analog comparators 24a and 24b, which are part of control means. A first threshold value is also applied to the analog comparator 24a from a first threshold value generator 26a, which is arranged to provide the first threshold value that is variable. The first threshold value may be, for example, the value of the RSSI signal corresponding to the received input level necessary for providing a bit error rate (BER) of, for example, 1e-4 (i.e. error of one bit per 10,000 bits) determined by the guaranteed quality for the received and reproduced audio signal. For example, in the case of FIG. 3, the reception level corresponding to a bit error rate of 1e-4 is 20 dB µV, and the magnitude of the corresponding RSSI signal is about 0.8 V. Accordingly, a value of 0.8 V is set as the first threshold. The analog comparator 24a develops an output signal in a first state, e.g. at a H-level, when the RSSI signal is equal to or smaller than the first threshold value, for example.

The analog comparator 24b receives a second threshold value from a second threshold value generator 26b, which is also arranged to provide the second threshold value that is variable. The second threshold value is greater than the first threshold value, which may be, for example, a value about the middle of the range between the first threshold value and the value at which the RSSI signal is saturated. The analog comparator 24b develops an output signal in the first state, for example, at the H-level, when the RSSI signal has a value above the second threshold value, for example.

Figure 3:
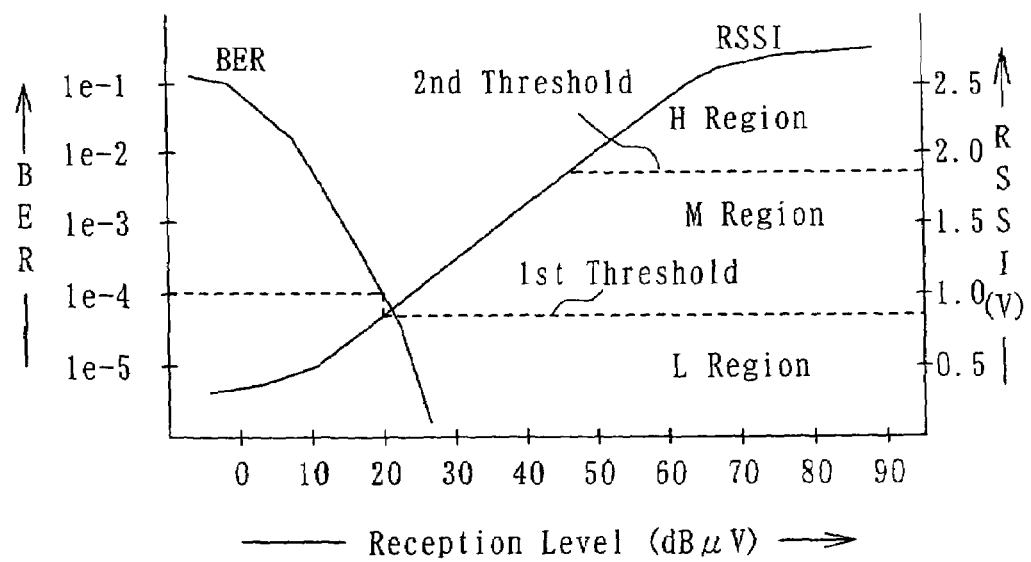
FIG. 3 illustrates the relationship between the reception level, the bit error rate, and the received signal strength indicative signal at the digital wireless receiver shown in FIG. 1.

The RSSI signal is compared with the thus determined first and second threshold values in the first and second comparators 24a and 24b, and, therefore, it is possible to know in which region the RSSI signal is located, an H region, an M region or an L region defined by the first and second threshold values, as shown in FIG. 3, by seeing what signals the analog comparators 24a and 24b develop. The H region is a region where the RSSI signal is greater than the second threshold value. The M region is a region for the RSSI signal having a value between the first and second threshold values. The L region is a region for the RSSI signal smaller than the first threshold value. The judgment is made in the diversity judging unit 28 to which the output signals of the analog comparators 24a and 24b are applied.

For example, when the RSSI signal is in the H region, it can be judged that the reception level is high and the bit error rate is small, and that the signal is relatively stable against fluctuations due to signal wave propagation. In the M region, the bit error rate is relatively small and stable, but the reception level tends to relatively fluctuate. The L region is a region where the reception level is low and the bit error rate is large.

The diversity judging unit 28 provides a switching signal to the antenna changeover switch 4. When the diversity judging unit 28 judges that the RSSI signal is in the H region, it provides a switching signal to maintain the connection to the high-frequency unit 8 of the currently selected antenna. If the RSSI signal is judged to be in the M region, the antenna switching is done. If the RSSI signal is judged to be in the H or M region after the antenna is changed, the connection of the selected antenna to the high-frequency unit 8 is maintained and the signal strength is determined again. If the diversity judging unit 28 judges that the RSSI signal is in the L region, which means that the reception is not satisfactory, it causes the muting circuit associated with the digital-to-analog converter 20 to operate. At the same time, the diversity judging unit 28 causes the antenna switching to be done, then, judges in which region the RSSI signal is, and would maintain the muting circuit operative and provide a switching signal to the antenna changeover switch 4 for switching to the other antenna if the RSSI signal is judged to be still in the L region.

The judgment made in the diversity judging unit 28 and the antenna switching by the changeover switch 4 are carried out upon detection by the decoding unit 12 of the guard bit section in each frame. Thus, each time a guard bit section of each frame appears, the diversity judging unit 28 makes judgment at least for antenna switching. Since the guard bit section is disposed at the end of each frame, when an antenna switching is done during the appearance of the guard bit section, establishment of synchronization is effected, using the preamble section of the next frame. Accordingly, if antenna switching is frequently done in the M region, for example, it does not interfere with the synchronization, and problems, such as generation of abnormal sound, do not occur.

The RSSI signal could be digitized and compared with digitized versions of the first and second threshold values in the diversity judging unit 28. However, as is understood from the relation between the bit error rate and the reception level shown in FIG. 3, the bit error rate is almost zero for the reception level above a certain level, e.g. about 22 dBµV. In such case, determining the region in which the RSSI signal is located, rather than digitizing the RSSI signal and making strict comparison, can eliminate time for digitizing the RSSI signal and time for making judgment in the diversity judging unit 28, so that higher speed processing and reduction of costs can be realized.

It should be noted, however, that the reception level comparison alone cannot detect a situation in which signals are not received satisfactorily because the reception level would be higher due to influence of disturbing waves. This is the reason why a bit error rate measuring unit 30 is provided in the error correcting unit 16. The bit error rate measuring unit 30 determines the bit error rate, and the determined bit error rate is applied to the diversity judging unit 28. The diversity judging unit 28 judges that the bit error rate is too large when the bit error rate is above a predetermined bit error rate, e.g. 1e-4, and provides, when the guard bit section is detected, processing like the ones done for the L region. More specifically, in such a case, the muting circuit is operated and the antenna is switched from one to the other.

Immediately after the receiver is powered, the synchronization has not yet been achieved in the preamble section synchronizing circuit 14, and, therefore, the bit error rate measuring unit 30 cannot determine the bit error rate. To deal with this problem, the bit error rate measuring unit 30 is provided with a buffer, which stores therein, error-free data as an initial value. Upon attainment of synchronization by the preamble section synchronization-detection circuit 14, the bit error rate measuring unit 30 starts determining the bit error rate, and, each time the bit error rate is determined, a new value is written into the buffer to renew the determination. If the received signal becomes small or if the bit error rate becomes large, the preamble section synchronization-detection circuit 14 is reset by the diversity judging unit 28 to thereby perform re-synchronization. The bit error rate measuring unit 30 cannot determine the bit error rate until the re-synchronization is achieved, but the last bit error rate determined is held in the buffer.

Now, the processing done in the diversity judging unit 28 is described with reference to the flow charts shown in FIGS. 4 and 5.

Figure 4:
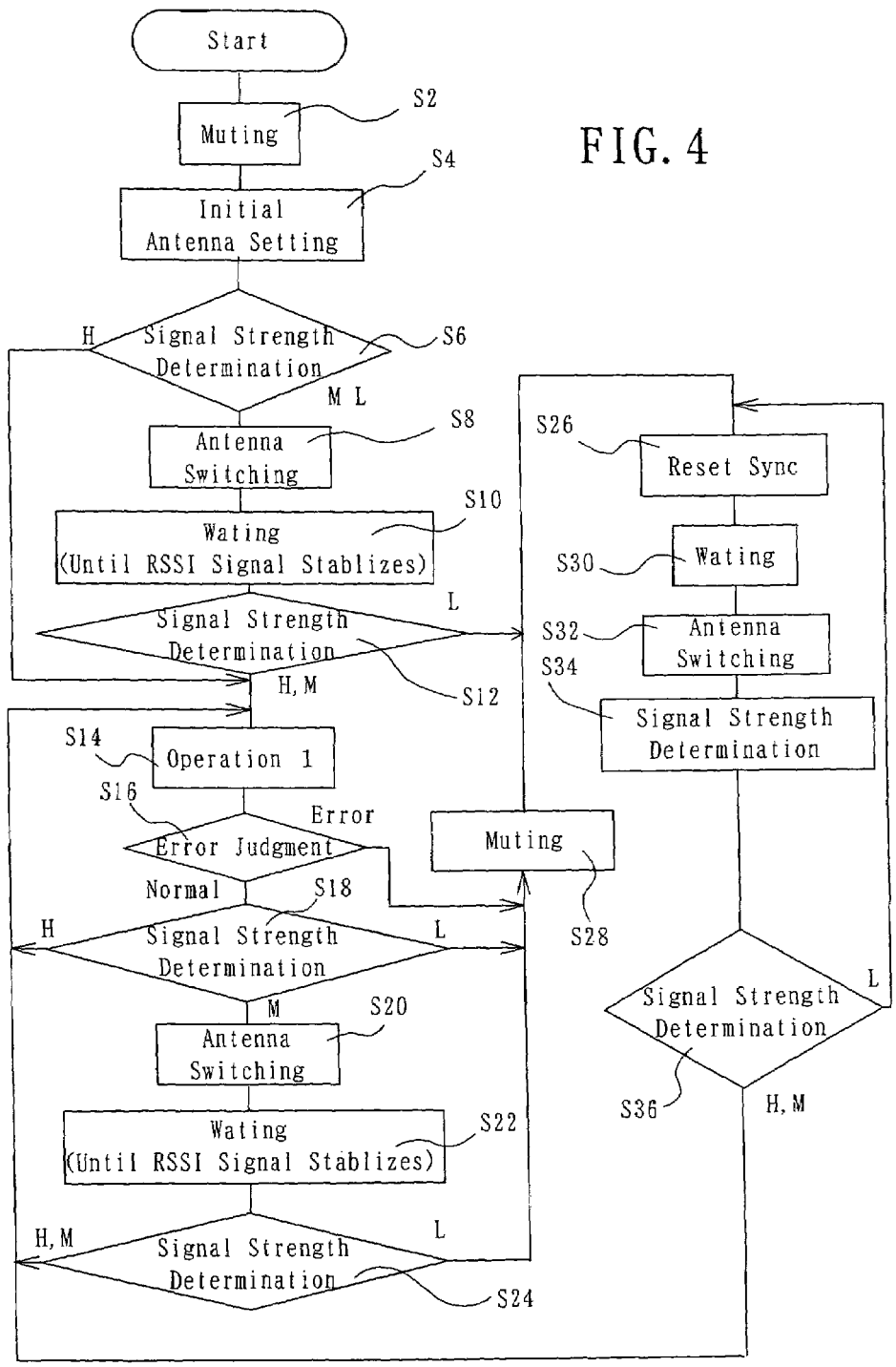
FIG. 4 is a flow chart of the operation of a diversity judging unit of the digital wireless receiver shown in FIG. 1.

As shown in FIG. 4, immediately following the application of power to the receiver, the diversity judging unit 28 causes the muting circuit to operate to prevent undesired noise from being generated (Step S2). Next, the initial antenna setting is carried out (Step S4). More specifically, the changeover switch 4 is operated so as to connect either the antenna 2a or 2b to the high-frequency unit 8.

Then, the determination of the signal strength is carried out (Step S6). Specifically, which region, the H, M or L region, the RSSI signal is in is judged. Since neither demodulation nor decoding has started yet, synchronization has not been attained yet. Therefore, the time for the judgment is arbitrarily determined.

If the judgment shows that the RSSI signal is in the M or L region, the antenna is changed (Step S8). More particularly, the changeover switch 4 is supplied with such a switching signal as to switch the receiving antenna from the currently selected antenna to the different one. After waiting for a short time until the RSSI signal stabilizes (Step S10), the signal strength determination is done (Step S12). As stated above, synchronization is not attained when the steps from Step S2 to S12 are being executed, no preamble section, no information data section or no guard bit section is detected. Under the circumstance, the receiver searches for an antenna whichever can provide large signal strength.

If the RSSI signal is judged to be in the H or M region in Step S12, or if the RSSI signal is judged in the H region in Step S6, operation 1 takes place (Step S14).

Figure 5:
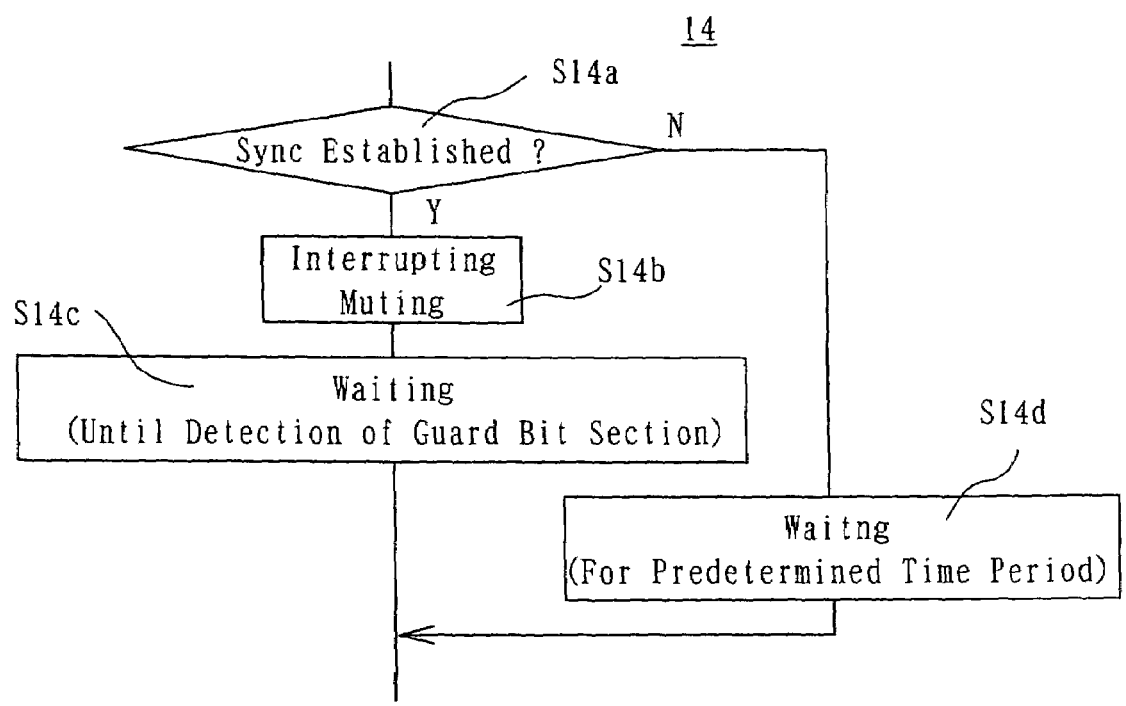
FIG. 5 shows, in detail, part of the flow chart shown in FIG. 4.

In the operation 1 in Step S14, whether the synchronization has been attained in the preamble section synchronization-detection circuit 14 is judged (Step S14a) as shown in FIG. 5. If it is judged that the synchronization has been attained, the operation of the muting circuit is stopped to interrupt the muting operation (Step S14b). In the bit error rate measuring unit 30, a bit error rate is being determined, as described above, which requires detection of a plurality of frames. Accordingly, it is desirable that the muting operation interruption in Step S14b be effected after the completion of determination of the bit error rate. For that purpose, the interruption of the muting operation is delayed so that it takes place after lapse of a time period of a plurality of frames following application of a command to interrupt the muting. Next, the detection of the next guard bit section is awaited. On the other hand, if it has been determined in Step S14a that synchronization has not been attained, lapse of a predetermined time period is awaited (Step S14d). The predetermined time period is described later.

Next, as shown in FIG. 4, the determined bit error rate and the threshold predetermined for the bit error rate are compared to make an error judgment (Step S16). If the determined bit error rate is judged to be smaller than the bit error rate threshold, the reception is considered to be normal, and the signal strength judgment is performed (Step S18). If this judgment indicates that the RSSI signal is in the H region, the processing returns to Step S14. Thus, when the RSSI signal is in the H region, the antenna is not changed, but the bit error rate judgment is repeated.

If the judgment made in Step S18 indicates that the RSSI signal is in the M region, the diversity judging unit 28, aiming to place the RSSI signal in the H region, provides a switching signal to the antenna switching unit 4 so that the antenna switching can be performed to connect the antenna different from the current antenna to the high-frequency unit 8 (Step S20).

The processing is waited for a short time after the antenna switching in Step S20 until the RSSI signal is stabilized (Step S22), and, then, the signal strength is determined again (Step S24). If it is judged that the RSSI signal is in the H or M region, the processing returns to Step S14. If it is judged, in Step S14, that the synchronization has been established, the error judgment in Step S16, the signal strength determination in Step S18, the antenna switching in Step S20, the waiting in Step S22, and the signal strength determination in Step S24 are completed in the period during which the guard bit section is being detected.

Even if the reception is judged to be normal in the error judgment, the antenna is changed to the other one if the RSSI signal is in the M region, and, after the antenna is switched, the signal strength determination is carried out again. If the determination indicates that the RSSI signal in the H or M region, the antenna switching is not performed, but the error judgment and the signal strength determination are performed.

If the RSSI signal is judged to be in the L region in Step S12, synchronization resetting is performed (Step S26). Specifically, a reset signal is applied to the preamble synchronization-detection circuit 14, for achieving re-synchronization. It should be noted that, if the received signal is judged to be erroneous in Step S16, or if the RSSI signal is judged to be in the L region in Step S18 or S24, the muting circuit is enabled (Step S28) and, after that, Step S26 is executed. The muting circuit is enabled in this case in order to prevent noise from being generated due to decrease of the RSSI signal or increase of the bit error rate. The synchronization is reset in Step S26 because it is possible that the increase of the bit error rate is due to loss of synchronization.

After that, the processing is waited for a predetermined time period (Step S30). The waiting for the predetermined time period in Step S30 and the waiting for the predetermined time period in Step S14d take place when the synchronization has not been established, and the predetermined time period is a time period corresponding to from, for example, several frames to several tens of frames. Thus, the time period is longer than the waiting time period in Steps S10 and S22. The antenna switching causes some signal dropout. Accordingly, if the waiting time period is short when synchronization is lost, signal dropout due to antenna switching would occur frequently. If signal dropout occurs in the preamble section, attainment of synchronization is impeded. It is, therefore, necessary to set antenna switching timing such that the antenna switching will not occur repetitively in the preamble section required for the establishment of synchronization, and to detect the preamble section in a timely fashion for establishing synchronization. A longer predetermined time period for waiting can facilitate synchronization, but frequency of antenna switching becomes lower, which causes improvement of the signal state to be delayed. Therefore an appropriate time period of between several frames and several tens of frames is selected. The predetermined time periods for Steps S14d and S30 can be equal or different. In Step S14d, since the signal strength is in the H or M region and, therefore, is sufficient, a longer predetermined time period is employed, giving priority to attainment of synchronization. In Step S30, since the RSSI signal is in the L region, indicating that the signal strength is insufficient, or the bit error rate is higher, indicating the signal state is unsatisfactory, a shorter predetermined time period is employed, giving priority to improving the signal state, so that the antenna switching can be performed quickly.

Following the waiting in Step S30, the antenna switching is performed (Step S32). Then, the processing is waited for a short time period until the RSSI signal stabilizes (Step S34), and, after that, the judgment of the signal strength is done again (Step S36). If the judgment indicates that the RSSI signal is still in the L region, the processing is repeated from Step S26, and the antenna is switched to the other one. If the judgment indicates that the RSSI signal is in the H or M region, Step S14 is executed.

Thus, if the error judgment done in Step S16 indicates that the signal reception is not normal, the antenna switching is done, but when the RSSI signal is in the H or M region after that, the error judgment is done again in Step S16. If the RSSI signal is judged to be in the L region in Step S12, S18 or S24, the antenna is switched to the other one, and, after that, the signal strength judgment is done. If the signal strength judgment indicates that the RSSI signal is still in the L region, the antenna is switched again. On the other hand, if the RSSI signal is judged to be in the H or M region, the error judgment of Step S16 is performed.

According to the above-described embodiment, two receiving antennas are employed, but the number of receiving antenna is not limited to two, and more than two receiving antennas may be used. According to the above-described embodiment, the error judgment based on the bit error rate is employed in addition to the received signal strength judgment based on the RSSI signal, but the error judgment may be eliminated if necessary. Further, according to the described embodiment, two threshold values are used for the received signal strength judgment to determine in which region the RSSI signal is, the H, M or L region, but one threshold may be used so that judgment is made as to whether the RSSI signal is in the L region or H region. Furthermore, the present invention has been described as being embodied in a digital wireless receiver for a digital wireless microphone, but it may be embodied in various receivers only if they are unidirectional digital wireless receivers.

The invention claimed is:

1. An antenna diversity digital wireless receiver for use in a communication system including a transmitter and an associated receiver sharing a single radio frequency channel, said receiver receiving said radio frequency channel all the time, said antenna diversity digital wireless receiver comprising:
 a plurality of receiving antennas for receiving a digital modulated signal from said transmitter, said digital modulated signal comprising a carrier signal of said radio frequency channel modulated with successively generated digital signal trains;
 antenna selecting means for selecting one of said antennas in response to a selection signal;
 receiving and demodulating means receiving and demodulating said digital modulated signal that said antenna selected by said antenna selecting means receives;
 level detecting means providing a reception level indicative signal indicative of the reception level of the digital modulated signal; and
 control means comparing said reception level indicative signal with a threshold value and changing said selection signal in accordance with the result of the comparison; and
 muting means;
 wherein said digital signal trains comprise a plurality of successive frames, each frame including error-correction coded information data, a preamble section preceding said information data for establishing synchronization of said information data, and a guard bit section succeeding said information data section;
 the change of said selection signal done by said control means and the antenna selection done by said antenna selecting means are effected each time said guard bit section is received;
 said receiving and demodulating means performs error-correction for said information data and also determines a bit error rate; and
 when said bit error rate is larger than a predetermined bit error rate threshold value, said control means causes said muting means to operate.

2. The antenna diversity digital wireless receiver according to claim 1 wherein said threshold value is set to a signal reception level corresponding to a predetermined bit error rate; and said control means causes said muting means to operate when said reception level indicative signal is smaller than said threshold value.

3. The antenna diversity digital wireless receiver according to claim 1 wherein:
 a first threshold value set to a signal reception level corresponding to a predetermined bit error rate and a second threshold value larger than said first threshold value are used for said threshold value; and
 said control means causes said muting means to operate when said reception level indicative signal is smaller than said first threshold level, and fixes said selection signal at a current value when said reception level indicative signal is greater than said second threshold value.

4. The antenna diversity digital wireless receiver according to claim 1 wherein: said reception level indicative signal and said threshold value are analog signals; and said control means includes analog comparing means for comparing said reception level indicative signal with said threshold value.

5. An antenna diversity digital wireless receiver for use in a communication system including a transmitter and an associated receiver sharing a single radio frequency channel, said receiver receiving said radio frequency channel all the time, said antenna diversity digital wireless receiver comprising:
 a plurality of receiving antennas for receiving a digital modulated signal from said transmitter, said digital modulated signal comprising a carrier signal of said radio frequency channel modulated with successively generated digital signal trains;

antenna selecting means for selecting one of said antennas in response to a selection signal;
receiving and demodulating means receiving and demodulating said digital modulated signal that said antenna selected by said antenna selecting means receives;
level detecting means providing a reception level indicative signal indicative of the reception level of the digital modulated signal;
control means; and
muting means;
wherein:
said digital signal trains comprise a plurality of successive frames, each frame including error-correction coded information data, a preamble section preceding said information data for establishing synchronization of said information data, and a guard bit section succeeding said information data section;
said receiving and demodulating means performs error-correction for said information data and also determines a bit error rate; and
said control means judges whether or not said bit error rate is larger than a predetermined bit-error-rate threshold value each time said guard bit section is received, and causes said muting means to operate when said bit error rate is larger than said bit-error-rate threshold value, said control means, when said bit error rate is not larger than said bit-error-rate threshold value, judging whether said reception level is smaller than a first reception-level threshold value set to a reception level corresponding to a predetermined bit en-or rate, is between said first reception-level threshold value and a predetermined second reception-level threshold value larger than said first reception-level threshold value, or is larger than said second reception-level threshold value, said control means causing said muting means to operate when said reception level is smaller than said first reception-level threshold value, changing said selection signal when said reception level is between said first and second reception-level threshold values, and maintaining said selection signal as it is when said reception level is larger than said second reception-level threshold value.

* * * * *